H. A. WHITING.

Machines for Binding and Wiring Hat-Frames

No. 6,047. Reissued Sept. 8, 1874.

Witnesses:
Chas. Wahlers
Henry Gestnes

Inventor:
Henry A. Whiting
p.
Van Santvoord & Hauff
attys

THE GRAPHIC CO. PHOTO-LITH. 39 & 41 PARK PLACE, N.Y.

UNITED STATES PATENT OFFICE.

HENRY A. WHITING, OF NEW YORK, N. Y.

IMPROVEMENT IN MACHINES FOR BINDING AND WIRING HAT-FRAMES.

Specification forming part of Letters Patent No. 147,724, dated February 17, 1874; reissue No. 6,047, dated September 8, 1874; application filed August 19, 1874.

*To all whom it may concern:*

Be it known that I, HENRY A. WHITING, of the city, county, and State of New York, have invented a certain new and useful Improvement in Machines for Binding and Wiring Hat-Frames, of which the following is a specification:

This invention consists in the combination of a swinging arm with a braid-guide, and with a mechanism for fastening the braid to a hat-frame, in such a manner that when a hat-frame has been finished the braid-guide can be swung back and the braid can be cut off between the guide and the mechanism for fastening the same, and thereby the operation of removing the hat-frame from the machine can be performed without drawing the braid out of the braid-guide, and much time is saved. This invention consists, further, in the combination of a tension-yoke and of a moistening-roller with the braid-guide and the mechanism for fastening the braid to a hat-frame, in such a manner that by the tension-yoke the braid is depressed upon the periphery of the moistening-roller, and then carried to the braid-guide and to the mechanism for fastening the braid without wrinkles. This invention consists, also, in the combination of a heating-chamber with the mechanism for fastening the braid, with the braid-guide, and with the moistening-roller, in such a manner that by the heat the moisture which the braid takes up from the moistening-roller is evaporated, and the braid is caused to adhere to the hat-frame with the requisite degree of tenacity.

This invention is illustrated in the accompanying drawing, in which—

Figure 1:
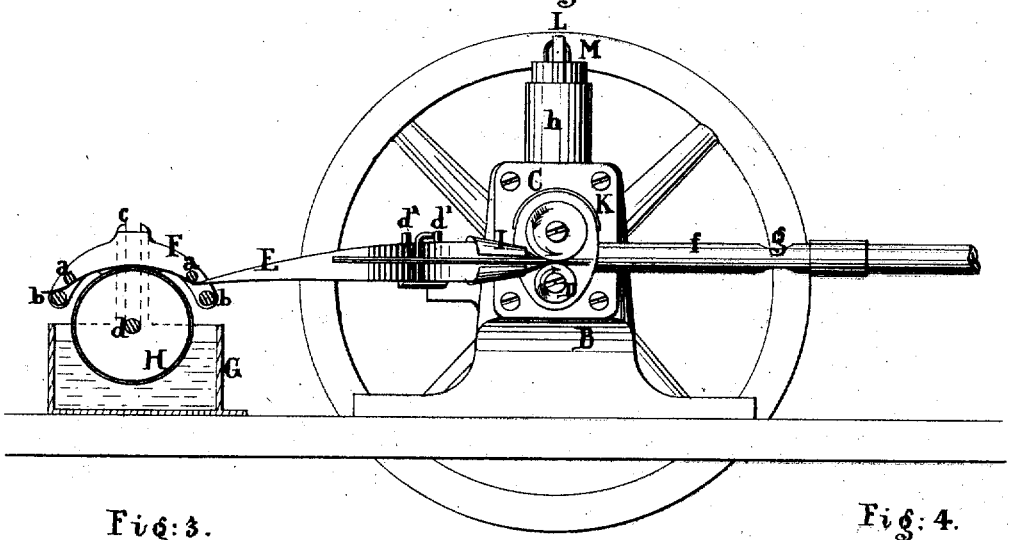
Figure 3:
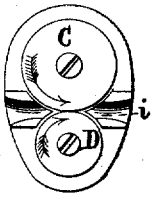
Figure 2:
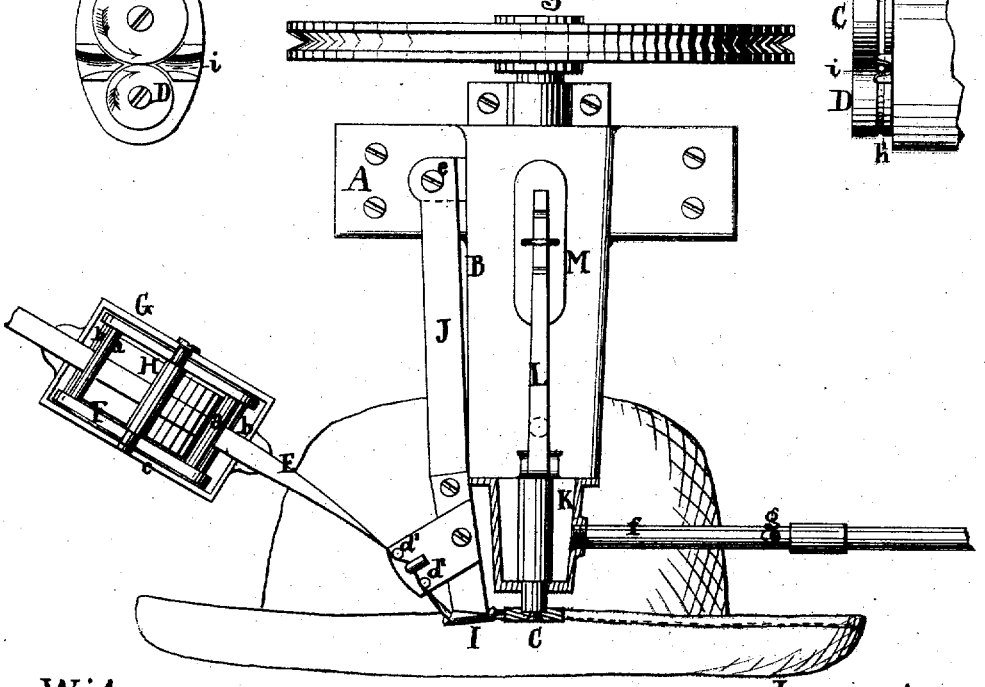
Figure 4:
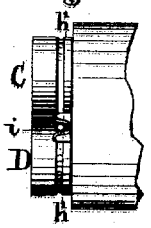

Figure 1 represents a front view. Fig. 2 is a sectional plan or top view. Figs. 3 and 4 show detached views of the mechanism for fastening the braid, consisting of pressing-rollers formed with grooves and channels for receiving, guiding, and delivering the braid-wire.

Similar letters indicate corresponding parts.

In this drawing, the letter A designates the bed-plate of my machine, from which rises a standard, B, that extends outward a sufficient distance to give room for the introduction of the edge of the hat-frames to the mechanism for fastening the braid. In the example shown in the drawing, this mechanism consists of two pressing-rollers, C D, which are secured to the ends of two shafts, the bearings of which are in the standard B, one above the other, said shafts being geared together, so that the pressing-rollers revolve with a uniform superficial velocity, as indicated by the arrows marked on them in Fig. 1. The braid E is taken from a spool, (not shown in the drawing,) and it is passed through between bars *a b*, which are secured in a yoke, F, that is fastened in slotted standards *c*, which rise from the sides of a cistern, G, containing water. Across this cistern extends an arbor, *d*, on which is mounted a roller, H, which dips into the water contained in the cistern, and which is covered with felt or other absorbent material capable of retaining the moisture. The yoke F straddles the moistening-roller H, and it can be adjusted in the standards *c* up or down, so that the braid which passes through between the bars *a b* is brought in contact with a greater or less portion of the circumference of the moistening-roller, as circumstances will require and experience dictate. As the braid is drawn through between the bars *a b* of the yoke F, it is prevented from wrinkling, and it imparts to the moistening-roller a revolving motion, so that the braid itself becomes moistened, and the sizing of said braid becomes adhesive.

From the moistening-roller the braid is carried through between the guide-pins *d'* to the braid-guide I, which is secured to the front end of an arm, J, that swings on a pivot, *e*, secured in a lug projecting from the side of the standard B, in such a manner that the braid-guide can be moved close to the mechanism for fastening the braid, or that it can be swung back away from said mechanism for the purpose of cutting off the braid without drawing it out of the braid-guide. To the front end of the standard B is secured a box, K, of sheet metal, which communicates by a pipe, *f*, with a gas-burner, *g*, and from which rises a smoke-pipe, *h*. (See Fig. 1.) When the gas is lighted, the box K forms a heating-chamber, and, as the heat comes in contact with the shafts of the pressing-rollers, the temperature of said rollers is raised to such a degree that the moisture previously absorbed is evaporated, and the braid is caused to adhere firmly to the edge of the hat-frame by the pressure of the rollers, and by the sizing of the braid, which has been softened by the moisture.

When a hat-frame is finished the arm J, which carries the braid-guide, is swung back away from the mechanism for fastening the braid, and the braid is cut between the guide and the finished hat-frame. When pressing-rollers are used for fastening the braid, they are held in contact by a spring-lever, L, from which is suspended a weight, M, and this weight is adjustable, so that the pressure can be increased or diminished to suit circumstances.

In Figs. 3 and 4 I have shown the pressing-rollers C D formed or provided with circumferential grooves *h h*, and on the box inclosing the shafts which carry said rollers are arranged projecting fingers or arms, which extend beyond the grooves *h*, and form a stationary channel, *i*, by which means the wire and braid are received, guided, and delivered, and all danger of the accidental slipping of said braid and wire from between the pressing-rollers is obviated or prevented.

What I claim as new, and desire to secure by Letters Patent, is—

1. The swinging arm J and braid-guide I, constructed substantially as described, in combination with a suitable mechanism for fastening the braid to a hat-frame.

2. The combination of the tension-yoke F and moistening-roller H with the braid-guide I and pressing-rollers C D, substantially as set forth.

3. The heating-chamber K, in combination with the pressing-rollers C D, braid-guide I, and moistening-roller H, substantially as shown and described.

In testimony that I claim the foregoing I have hereunto set my hand and seal this 12th day of August, 1874.

HENRY A. WHITING. [L. S.]

Witnesses:

W. HAUFF,

E. F. KASTENHUBER.